Jan. 16, 1968  H. HAUFE ET AL  3,363,928
HOLDING AND CARRYING DEVICE
Filed Oct. 19, 1965
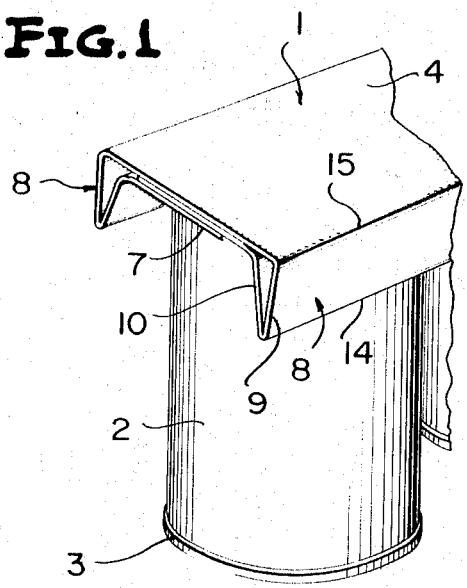
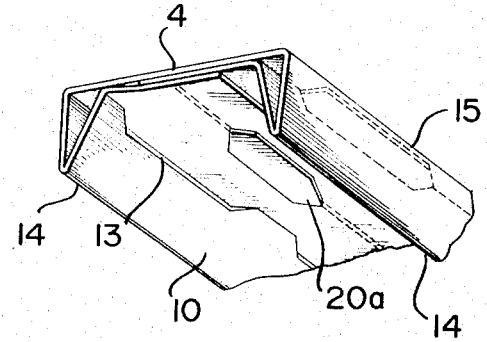
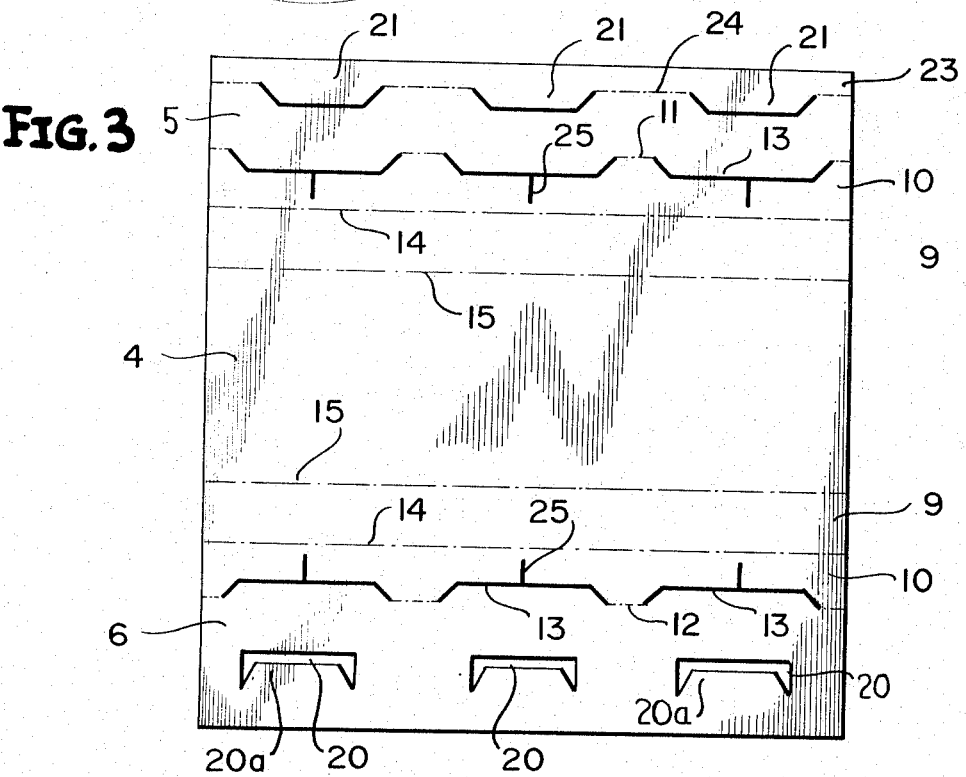
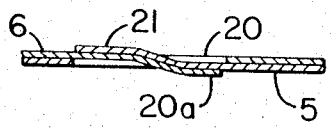
INVENTORS
Hans Haufe
Josef Detzel
BY
Mason, Porter, Diller & Brown
ATTORNEYS

United States Patent Office

3,363,928
Patented Jan. 16, 1968

3,363,928
HOLDING AND CARRYING DEVICE
Hans Haufe and Josef Detzel, Kempten, Allgau, Germany, assignors to Continental Can Company, Inc., New York, N.Y., a corporation of New York
Filed Oct. 19, 1965, Ser. No. 498,012
Claims priority, application Germany, Nov. 12, 1964, C 34,340
7 Claims. (Cl. 294—87.2)

ABSTRACT OF THE DISCLOSURE

The disclosure has to do with a generally U-shaped sleeve member which is telescopable over ends of a plurality of cans arranged in a row and interlockable therewith to form a readily handleable package. The sleeve member is formed from a single sheet of material and has the remote ends thereof interlocked to form an inner floor layer in direct engagement with the cans.

---

The invention is concerned with a holding and carrying device made of paperboard for objects arranged in a row, particularly cans.

In the past there have been developed similar holding devices which are particularly suitable for cooperation with cans having an upper protruding rim or chime and which devices are formed of a double layered member which in its position for use has a U-shaped cross-section including double layered sidewalls. The member is originally prefabricated in a flat form and is subsequently folded into a flattened tube formation and the longitudinal edges of the blank have been connected firmly with one another through gluing, tacking or other similar means. In a holding member of this type, the outside layers of the sidewalls are joined at right angles to the outside layer of the base while the inside layers of the sidewalls have recesses receiving the protruding rims or chimes of the objects or cans with portions of the inside sidewall layers being disposed below the protruding rims or chimes. The inside layers of the sidewalls extend from the inside layer of the base to the outside layers of the sidewalls and in inclination to the outside layers of the sidewalls and the inside sidewall layers are elastically pressed against the outside sidwall layers by the objects disposed within the holding and carrying device in the areas of contacts with the objects. Therefore, in the area of the recesses formed therein, the inner sidewall layers form elastic clamping elements which, during the insertion of the objects, elastically catch below the protruding rims of the objects and the objects are held in this clamped position through the elastic deformation of the inside layers of the sidewalls. As a result, despite the fact that the holding device is applied to a row of objects by merely superimposing the holding device on the objects, a firm connection will develop between the holding device and the objects so that the objects can be handled as a unit through the gripping of only one object without there being any need for exerting a pressure or clamping force on the holding device.

It is the object of this invention to improve the aforementioned holding device in a manner wherein the holding device can be produced, packed and shipped in the form of the original blank and it is only necessary to transform it into the shape of a flattened tube at the place of use with the forming of a cemented connection between the edges of the blank being eliminated. For this purpose and in accordance with the invention, the inner layer of the base has been formed by the remote edges of the blank and these edges have been provided with cuts configurated so that one edge of the blank has a plurality of tongues or tabs and the other edge of the blank has openings receiving the tongues and interlocking the edges against the spreading effects of objects within the holding device with the connection between the edges being one that can be easily detached.

A further object of this invention is to provide a holding device wherein when the holding device is applied to objects and the objects are clamped thereby, the clamping reaction force between the holding device and the objects will also serve to effect a firm interlocking of the edges of the holding device whereby separation of the edges is prevented.

With the above and other objects in view that will hereinafter appear, the nature of the invention will be more clearly understood by reference to the following detailed description, the appended claimed subject matter, and the several views illustrated in the accompanying drawing.

In the drawing:

FIGURE 1 is a fragmentary perspective view showing one end of a package formed in accordance with this invention.

FIGURE 2 is a fragmentary bottom perspective view of the holding device as it appears ready to receive a row of objects.

FIGURE 3 is a plan view of the blank from which the holding device of FIGURE 2 is formed.

FIGURE 4 is an enlarged fragmentary transverse sectional view taken through the inner floor layer and shows the details of the connection between the two partial panels thereof.

Referring now to the drawing in detail, it will be seen in FIGURE 1 that the holding or carrying device 1 is particularly adapted for objects 2 which have on at least their upper ends protruding rims 3. The illustrated objects 2 are cans and the protruding rims are the chimes 3.

In this position for use, the holding device 1 has essentially the shape of a U and is in the form of a flattened tube so that all parts of the U consist of two layers of material. The holding device 1 thus has an outside base or bottom part 4 and an inside base layer or floor part 7, which part is formed by two edge portions 5 and 6 of the blank shown in FIGURE 3. The holding device 1 also has a pair of side formations 8, each of which consists of an outside layer 9 and an inside layer 10. The outside layer 9 is disposed approximately perpendicular to the outside base layer 4, while the inside layer 10 slopes towards the outside of the holding device 1 starting from the edge of the floor part 7 and extending to the lower edge of the outside layer 9.

As can be seen best in FIGURE 3, the edge portions 5 and 6 of the holding device blank are connected to the remainder of the blank along lines deformed in part by fold lines 11 and 12 and in part by grooves or recesses 13. As is clearly shown in FIGURE 2, when the holding device 1 is in its shape ready for reception of the objects 2, the grooves or recesses 13 form openings into which the rims or projections 3 of the objects 2 may project. When the holding device 1 is applied to a row of objects 2, the inside layers 10 elastically deform outwardly along the areas of contact with the objects with these areas being spread outwardly into pressure engagement with the outside layers 9. The outside layers 9 are connected not only to to the inside layers 10, but also to the outside base layer 4, these connections being along the fold lines 14 and 15, respectively.

The holding device of this invention differs from the prior devices in that the edge portions 5 and 6 of the blank are hooked together in the forming of the inside floor layer 7. In order that this may be accomplished, the edge portion 6 is provided with cutouts 20 generally in alignment with the recesses 13 and the edge portion 5 is provided with generally U-shaped cut lines defining tongues or tabs 21. The tongues or tabs 21 pass through the cutouts 20 and interlock with the material of the edge portion 6 in the manner best shown in FIGURE 4. It will be apparent that as the edge portions 5 and 6 are urged apart due to the engagement of the holding device 1 with the objects 2, the tongues or tabs 21 will be more firmly engaged within the cutouts 20. This arrangement has the advantage over prior devices in that the locking of the edge portions 5 and 6 can be readily accomplished before the holding device is applied to the objects 2 and since the connection is merely one of interlocking of the tongues or tabs 21 in the cutouts 20, the connection may be easily released.

In order to facilitate the locking together of the edge portions 5 and 6, the cutouts 20 are in the shape of generally C-shaped windows into which tongues or tabs 20a protrude. The tongues 21, as is apparent from FIGURE 3, are disposed along an edge portion 23 which is hingedly connected to the edge portion 5 along an interrupted fold line 24. By first reversely folding the edge portion 23 along the fold line 24 into generally overlying relation with respect to the edge portion 5, the tongues 21 may be readily introduced into the cutouts 20. At the same time, the tongues or tabs 20a will pass into the cutouts formed in the making of the tongues or tabs 21 so that the tongues or tabs 20a and 21 will hook behind one another.

In order to facilitate the elastic deformation of the inner sidewall layers 10, while preventing the tearing of the same, notches or cut lines 25 are formed in the sidewall layers 10 running from the recesses or cut lines 13 perpendicularly thereto and towards the fold line 14.

Although only a preferred embodiment of the invention has been specifically illustrated and described herein, it is to be understood that minor variations may be made in the holding and carrying device within the general spirit and scope of the invention as defined by the appended claims.

We claim:

1. A holding and carrying device particularly adapted for cooperation with objects having a peripheral projection at one end thereof, said holding device being of a double layered construction folded from a single sheet of material and having a generally U-shaped cross-section; said holding and carrying device including an outer base layer having integral outer sidewall layers extending at right angles thereto, and an inner floor layer underlying said outer base layer and having integral inner sidewall layers sloping outwardly therefrom and connected to said outer sidewall layers remote from said base layer, said inner sidewall layers being adapted to have objects forcibly received therebetween with said inner sidewall layers resiliently retaining objects in place; the improvement residing in said floor layer being formed by remote edge portions of said sheet of material having a releasably interlocking connection subject to tightening by movement of said inner sidewall layers apart upon the application of objects therebetween, said interlocking connection being formed by tabs formed on one remote edge portion spaced from a terminal edge thereof and tab receiving cutouts on the other remote edge portion.

2. The holding and carrying device of claim 1 wherein said one remote edge portion is swingable along a fold line at the bases of said tabs to facilitate the passage of said tabs into said cutouts.

3. The holding and carrying device of claim 1 wherein said other remote edge portion has second tabs projecting into said cutout for hook-like engagement with the first mentioned tabs.

4. The holding and carrying device of claim 1 wherein said one remote edge portion is swingable along a fold line at the bases of said tabs to facilitate the passage of said tabs into said cutouts and said other remote edge portion has second tabs projecting into said cutouts for hook-like engagement with the first mentioned tabs.

5. A holding and carrying device particularly adapted for cooperation with objects having a peripheral projection at one end thereof, said holding device being of a double layered construction folded from a single sheet of material and having a generally U-shaped cross-section; said holding and carrying device including an outer base layer having integral outer sidewall layers extending at right angles thereto, and an inner floor layer underlying said outer base layer and having integral inner sidewall layers sloping outwardly therefrom and connected to said outer sidewall layers remote from said base layer, said inner sidewall layers being adapted to have objects forcibly received therebetween with said inner sidewall layers resiliently retaining objects in place; the improvement residing in said floor layer being formed by remote edge portions of said sheet of material having a releasably interlocking connection subject to tightening by movement of said inner sidewall layers apart upon the application of objects therebetween, said inner sidewall layers having object projection receiving openings each defined by a generally U-shaped cut line, and an expansion notch in each inner sidewall layer adjacent to and intersecting each U-shaped cut line generally normal thereto.

6. A blank for a holding and carrying device particularly adapted for cooperation with objects having a peripheral projection at one end thereof and arranged in a single row, said blank comprising a rectangular sheet of material having a plurality of substantially symmetrically arranged longitudinal fold lines formed therein defining a plurality of longitudinally extending panels, said panels including a centrally positioned outer base layer panel, outer sidewall layer panels on each side of said outer base layer panel, an inner sidewall layer panel next adjacent to each of said outer sidewall layer panels, and a pair of partial inner floor layer panels along the remote ends of said sheet, and connecting means of the interlocking type carried by said partial inner floor layer panels.

7. The blank of claim 6 wherein said connecting means includes generally tapered tabs formed in one of said partial inner floor layer panels and facing towards the other of said partial inner floor layer panels, cutouts in said other partial inner floor layer panel in transverse alignment with said tabs, and second tabs on said other floor layer panel projecting into said cutouts and facing towards said one partial inner floor layer panel.

References Cited

UNITED STATES PATENTS

| | | | |
|---|---|---|---|
| 3,005,654 | 10/1961 | Stone et al. | 294—87.2 |
| 3,035,692 | 5/1962 | Forrer | 206—65 |
| 3,075,799 | 1/1963 | Weiss | 294—87.2 |
| 3,099,475 | 7/1963 | Manizza | 294—87.2 |

HUGO O. SCHULZ, *Primary Examiner.*